Figure 1:
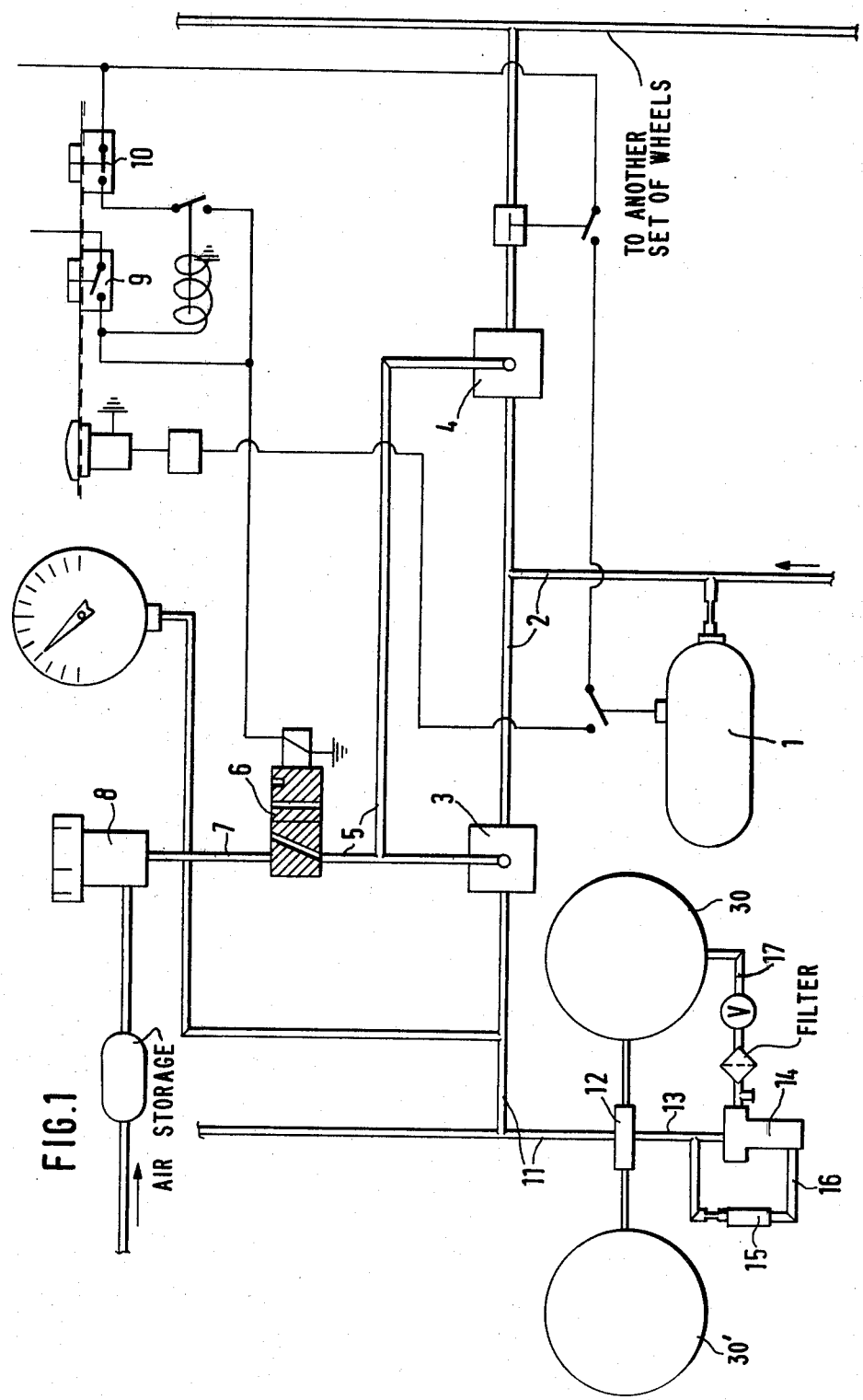

United States Patent [19]

Brockmann

[11] 4,313,483

[45] Feb. 2, 1982

[54] APPARATUS FOR REGULATING THE AIR PRESSURE IN TIRES OF CROSS-COUNTRY VEHICLES

[76] Inventor: Heinrich Brockmann, Eisenacher-Strasse 1, 6750 Kaiserslautern, Pfalz, Fed. Rep. of Germany

[21] Appl. No.: 38,524

[22] Filed: May 14, 1979

[30] Foreign Application Priority Data

May 26, 1978 [DE] Fed. Rep. of Germany ....... 2823045

[51] Int. Cl.³ .............................................. B60C 23/10
[52] U.S. Cl. ...................................... 152/416; 73/714; 73/756; 116/34 R; 137/224; 137/492.5; 340/58
[58] Field of Search ....................... 152/415, 416, 417; 137/492.5, 488, 227, 224; 73/714, 756, 146.2, 146.8; 116/34 R; 340/58

[56] References Cited

U.S. PATENT DOCUMENTS 2,685,906  8/1954  Williams ............................. 152/417

FOREIGN PATENT DOCUMENTS 2141553  2/1973  Fed. Rep. of Germany .

Primary Examiner—William A. Powell
Assistant Examiner—Thomas Bokan
Attorney, Agent, or Firm—Orville N. Greene

[57] ABSTRACT

In cross-country vehicles where it is desirable to change the pressure in the pneumatic tires of the vehicle to fit the terrain, means are provided for changing the pressure on the tires without leaving the seat of the vehicle. The means provided in this disclosure comprise a source of compressed air, air control valves for each wheel of the vehicle, control keys including a magnetic valve, etc., for venting air from or forcing air to the tires, all somewhat similar to the arrangement disclosed in (Ger) DE-OS No. 2,141,553 but the sensitive throttle added to the latter disclosure is omitted and instead, a relief valve is provided for the air control valve of the wheels whereby the venting time is shortened and less of the apparatus as a whole is maintained under high pressure.

4 Claims, 2 Drawing Figures

APPARATUS FOR REGULATING THE AIR PRESSURE IN TIRES OF CROSS-COUNTRY VEHICLES

The invention concerns an apparatus for regulating the air pressure in tires of cross-country vehicles. The simplest possibility of air release, for only the diminishing of tire pressure, consists of temporarily opening a valve directly in the tire. This is difficult in swampy land, to say the least, and impossible with amphibious vehicles during trips over water. Accordingly it has already been proposed to change the tire pressure during the trip in such a manner as to establish the desired tire pressure over a delicately controlled valve with the aid of the brake pressure reservoir. This, however, has the drawback that the pressure line remains fixed under pressure through the ring chamber packing in the vehicle axle.

From (German) DE-OS No. 2,141,553 a tire pressure regulating means is known moreover by which a wheel control valve is employed which closes under spring pressure when the supply line is made pressureless. With such an installation it is possible to regulate the tire pressure during the trip without getting out of the driver's seat in the vehicle. With the known installation a relatively high pressure going from a compressed air reservoir leads to one or more valves which is so influenced by a control device that only the desired pressure flows to the tires through a ring chamber packing. The compressed air flows finally over the wheel control valve already mentioned, which opens at a predetermined low pressure and lets the compressed air flow into the tires up to a provided-for maximal pressure.

The pressure range usually lies between about 0.7 bar as the lower limit and 2.3 bars as the upper limit. The highest pressure, for example, can be necessary at the considered highest speed of the vehicle of about 80 Km/hr. on the highway, while in the country with low speeds, the pressure can be reduced down to the lower limits. Thereby a broader support of the tire surface on the ground is attained, the so-called "tire footing" will be increased and the rolling friction in flexible bodies essentially diminished. The adherability and the traction force can be increased so that final enhancement up to about 75% is overcome. Obviously, any intermediate values are attainable.

With the known installation the inaccurate closing of the wheel control valves must be put up with. If, for example, the tires are inflated to a pressure of 2.3 bars, the pressure in the feeding line must subsequently be diminished down to 0.7 bar, to close the wheel control valve thereby. In doing so, however, pressure leaves the tires. In order to treat this, a throttle is built into the known installation between the wheel control valve and the tires. The stipulated venting time through the throttle from 2.3 bars to 0.7 bar is much too long. Besides, the venting or at least an essential pressure diminishing of the compressed air line in relation to the maximum pressure, is also important for relief of the ring chamber coupling since it obviously is subject to more wear at high pressure than at low pressure.

The invention accordingly is based on the problem of devising an apparatus for regulating the tire pressure of pneumatic tires of cross-country vehicles, especially amphibian vehicles which, first, as the above-described known installation, comprises an air pressure source, a magnetic valve controllable through a pressure key on the one side and a venting key on the other side as well as a preselected switch for the adjustment of air pressure, and, finally, associated wheel control valves, one for each wheel, which apparatus is improved in such a manner that a satisfactory and safe working-order regulation of tire pressure can be undertaken which moreover is insensitive to the influence of inevitable hard driving.

The invention solves the problems emanating from the above-described apparatus by connecting each wheel control valve in series with a relief valve with back flow.

Advantageously the back flow can be protected by equipping each relief valve with a back flow valve.

With these improvements it is assured that a satisfactory and quick closing of the wheel control valve is guaranteed without the arrangement with the described sensitive throttle.

Further features of the invention and details of the advances attained are given in the following specifications in connection with the attached drawing which shows schematically and by way of example an embodiment of the invention.

In the drawing:

FIG. 1 shows a device for regulating the tire pressure with the additions and improvement of the invention.

Figure 2:
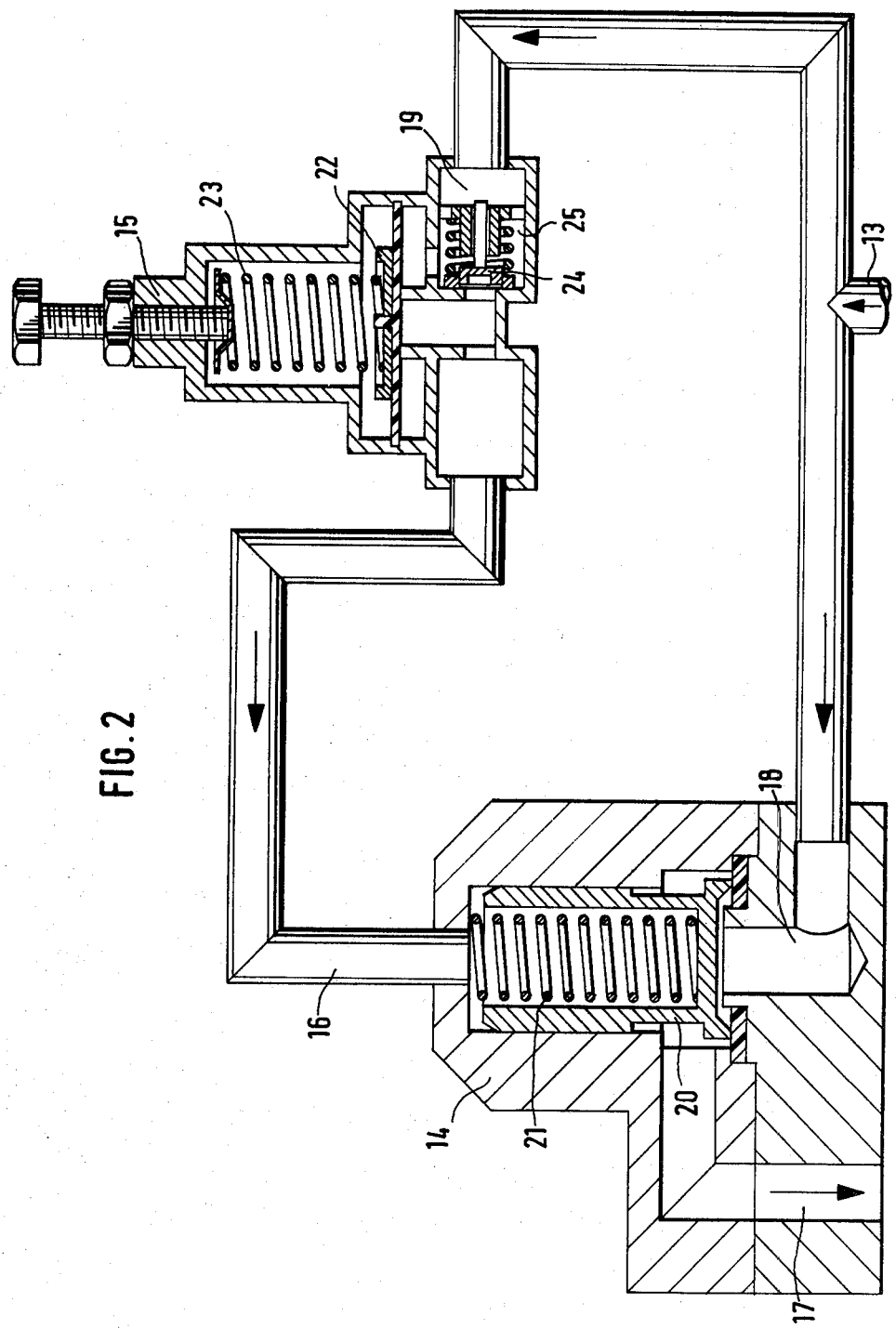

FIG. 2 reproduces the overflow or relief valve with the back flow valve in combination with the wheel control valve (in section) according to the invention.

From a compressed air reservoir 1 with a pressure, for example, of about 8 bars, which is obtained from an air compressor (not shown), a compressed air line 2 leads to relay valves 3 and 4. The compressed air line 2 therefore always remains under the exampled pressure.

The relay valves 3 and 4 are both connected to a compressed air line 5 which moreover leads to a magnetic valve 6. This magnetic valve 6 is connected through a pressure line 7 with an individual line switch 8 on which the desired pressure, e.g., from a given lower limit of 0.7 bar to an upper limit of 2.3 bars, can be preselected. From the relay valves 3 and 4 the compressed air line 11 leads to the wheel axles of the vehicle. The magnetic valve 6 is moreover electrically connectable on the one side by means of signalling key 9 and on the other side by means of a pressure release key 10. By opening magnetic valve 6, as by depressing signalling key 9, the relay valves 3 and 4 are so controlled that air is discharged in the compressed air line 11 in accordance with the pressure established by preselected line switch 8.

In FIG. 2 the connection for only one wheel 30 of the front axle shows which moreover lies in the plane of the drawing. The additional coordinated installation parts of this wheel are provided in similar ways to all other wheels 30′ of the vehicle.

A ring chamber packing 12 serves for connecting the compressed air line 11 with the wheels, from the chamber 12 a compressed air line 13 leads to a wheel control valve 14 as also to a relief valve 15. Between the relief valve 15 and the wheel control valve 14 there is provided a further connection in the form of a compressed air line 16. The desired pressure is finally supplied from control valve 14 over the compressed air line 17 to the pneumatic tires of every wheel.

From the cross-sectional showing of the control valve 14 and the relief valve 15 together with the coordinated lines 13, 16 and 17 of FIG. 2 there results the essential unit of the invention.

The compressed air line 13 remains connected to the antechamber 18 of the control valve 14 as well as with the antechamber 19 of the relief valve 15. A guided valve head 20 with a spring 21 is arranged in wheel control valve 14. The spring is set for the lowest pressure for the pneumatic tire, namely (preserving the chosen example) about 0.7 bar. From the wheel control valve 14, the compressed air line 17 leads, as already mentioned, to the respective valve of the allied pneumatic tire.

The relief valve 15 is likewise equipped with a guided valve head 22 in which an adjustable spring 23 operates which in the frame of the abiding example is adjustable to a pressure of 2.3 bars. The exit from the relief valve 15 goes through the line 16, which is guided to the wheel control valve in such a manner that, by opening the relief valve, the excess pressure operates on the back side (the spring side in the illustrated example) of the valve head 20 in the wheel control valve 14. Therewith, as soon as the maximum tire pressure is reached, the wheel control valve closes, so much the more, since the closing force is added to the force of the spring 21. With the satisfactory closing of the wheel control valve attained in this way, the compressed air line 13 and the ring chamber packing 12 is vented, furthermore the compressed air line 11 controlled through application of the evacuation button 10 controls the magnetic valve 6.

The throttles used up to now with their drawbacks are no longer necessary. With the chosen manometer or also the control light, the quick venting of the compressed air line and therewith the satisfactory closing of the wheel control valve can be controlled. In comparison with the installation with the throttle, the blow-off time from highest to the lowest pressure can be diminished to less than 15% of the time necessary up to now.

Therewith also the compressed air line or the tube 16 is vented, there is provided in the antechamber of the relief valve 15, a backflow valve 24, which is closed by the pressure in the compressed air line 13 and opens with an excess pressure in compressed air line 16 so that over this outlet the pressure in compressed air line 16 can be reduced.

I claim:

1. Apparatus for regulating the air pressure in tires of wheel pairs mounted on axles of cross country vehicles, especially amphibian vehicles, of the type having a source of compressed air, at least one relay valve connected to such compressed air source, a pressure and venting valve connected to said relay valve controllable on one side by a pressure key and on the other side by a venting key, a preselecting switch connected to the pressure side of said pressure and venting valve, a compressed air pipe extending from said relay valve to an axle of the vehicle, and separate means connecting the said compressed air pipe to each of the tires of said axle, the improvement wherein each of said means connecting the compressed air pipe line to the tires consisting essentially of a wheel control valve with a valve head, adapted to pass air to the tire at pressures above the lowest pressure for said tire, a relief valve, an air pressure line connected to one side of each of said wheel control valve and relief valve, an air pressure line connecting a second pressure side of said relief valve to the head side of said wheel control valve whereby air passing said relief valve is applied against the head side of said wheel control valve.

2. The apparatus as claimed in claim 1 wherein each relief valve is equipped with a back flow valve.

3. The apparatus as claimed in claim 1 comprising a pressure gauge in the field of view of the driver for signalling the closing of the wheel control valve.

4. The apparatus as claimed in claim 1 comprising lighting means in the field of view of the driver for signalling the closing of the wheel control valve.

* * * * *

UNITED STATES PATENT OFFICE
CERTIFICATE OF CORRECTION

Patent No. 4 313 483  Dated February 2, 1982

Inventor(s) Heinrich Brockmann

It is certified that error appears in the above-identified patent and that said Letters Patent are hereby corrected as shown below:

On The Title Page insert -- (73) Assignee:
    Eisenwerke Kaiserslautern Göppner GmbH
    Kaiserslautern/Pfalz (Germany). --.

Signed and Sealed this

Seventeenth Day of August 1982

[SEAL]

Attest:

Attesting Officer

GERALD J. MOSSINGHOFF
Commissioner of Patents and Trademarks